(12) United States Patent
Ichimura

(10) Patent No.: US 12,275,275 B2
(45) Date of Patent: Apr. 15, 2025

(54) PNEUMATIC TIRE

(71) Applicant: The Yokohama Rubber Co., LTD., Tokyo (JP)

(72) Inventor: Akihiro Ichimura, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 203 days.

(21) Appl. No.: 17/757,855

(22) PCT Filed: Sep. 18, 2020

(86) PCT No.: PCT/JP2020/035576
§ 371 (c)(1),
(2) Date: Jun. 22, 2022

(87) PCT Pub. No.: WO2021/131183
PCT Pub. Date: Jul. 1, 2021

(65) Prior Publication Data
US 2023/0050450 A1 Feb. 16, 2023

(30) Foreign Application Priority Data

Dec. 27, 2019 (JP) ................................ 2019-239261

(51) Int. Cl.
*B60C 11/00* (2006.01)
*B60C 11/03* (2006.01)

(52) U.S. Cl.
CPC ...... *B60C 11/0083* (2013.01); *B60C 11/0302* (2013.01); *B60C 2011/0353* (2013.01); *B60C 2011/0369* (2013.01)

(58) Field of Classification Search
CPC ............. B60C 11/0083; B60C 11/0302; B60C 2011/0353; B60C 2011/0369

USPC .................................................... 152/209.14
See application file for complete search history.

(56) References Cited

U.S. PATENT DOCUMENTS

| | | | | |
|---|---|---|---|---|
| 4,756,352 A | * | 7/1988 | Ogawa | B60C 11/01 152/DIG. 3 |
| 2016/0221396 A1 | * | 8/2016 | Takamasu | B60C 11/0083 |
| 2019/0329596 A1 | * | 10/2019 | Hiraishi | B60C 11/00 |

FOREIGN PATENT DOCUMENTS

| | | | | |
|---|---|---|---|---|
| JP | H06191223 A | * | 7/1994 | |
| JP | 08337101 A | * | 12/1996 | ......... B60C 11/0083 |
| JP | 11-1103 A | | 1/1999 | |
| JP | 2004-74914 A | | 3/2004 | |
| JP | 2008222117 A | * | 9/2008 | |

(Continued)

OTHER PUBLICATIONS

Aoki C, JP-11001103-A, updated machine translation. (Year: 1999).*

(Continued)

*Primary Examiner* — Sedef E Paquette
(74) *Attorney, Agent, or Firm* — Thorpe North & Western

(57) ABSTRACT

Provided is a pneumatic tire. In a tire meridian cross-sectional view of an unloaded state in which regular internal pressure is applied, a tire profile between two ground contact edges is constituted by two tire outer side profiles each having a dimension along the tire profile of 20% or more and 35% or less with respect to a dimension between the ground contact edges along the tire profile, and a tire inner side profile other than the two tire outer side profiles, the tire outer side profiles being constituted by at least four curved lines having different shapes.

6 Claims, 1 Drawing Sheet

(56) References Cited

FOREIGN PATENT DOCUMENTS

| | | | | |
|---|---|---|---|---|
| JP | 2013199266 | A | * | 10/2013 |
| JP | 2018-079903 | A | | 5/2018 |
| JP | 6544267 | B2 | * | 7/2019 |
| KR | 20040043973 | A | * | 5/2004 |
| WO | 2015/037336 | A1 | | 3/2015 |
| WO | 2017/217426 | A1 | | 12/2017 |

OTHER PUBLICATIONS

Tsuji K, JP-2008222117-A, machine translation. (Year: 2008).*
Otsuji H, JP-2013199266-A, machine translation. (Year: 2013).*
Hanya M, JP-08337101-A, machine translation. (Year: 1996).*
Kwon, KR-20040043973-A, machine translation. (Year: 2004).*
Yamamoto T, JP-6544267-B2, machine translation. (Year: 2019).*
Arakawa Atsushi, JP-H06191223-A, machine translation. (Year: 1994).*

* cited by examiner

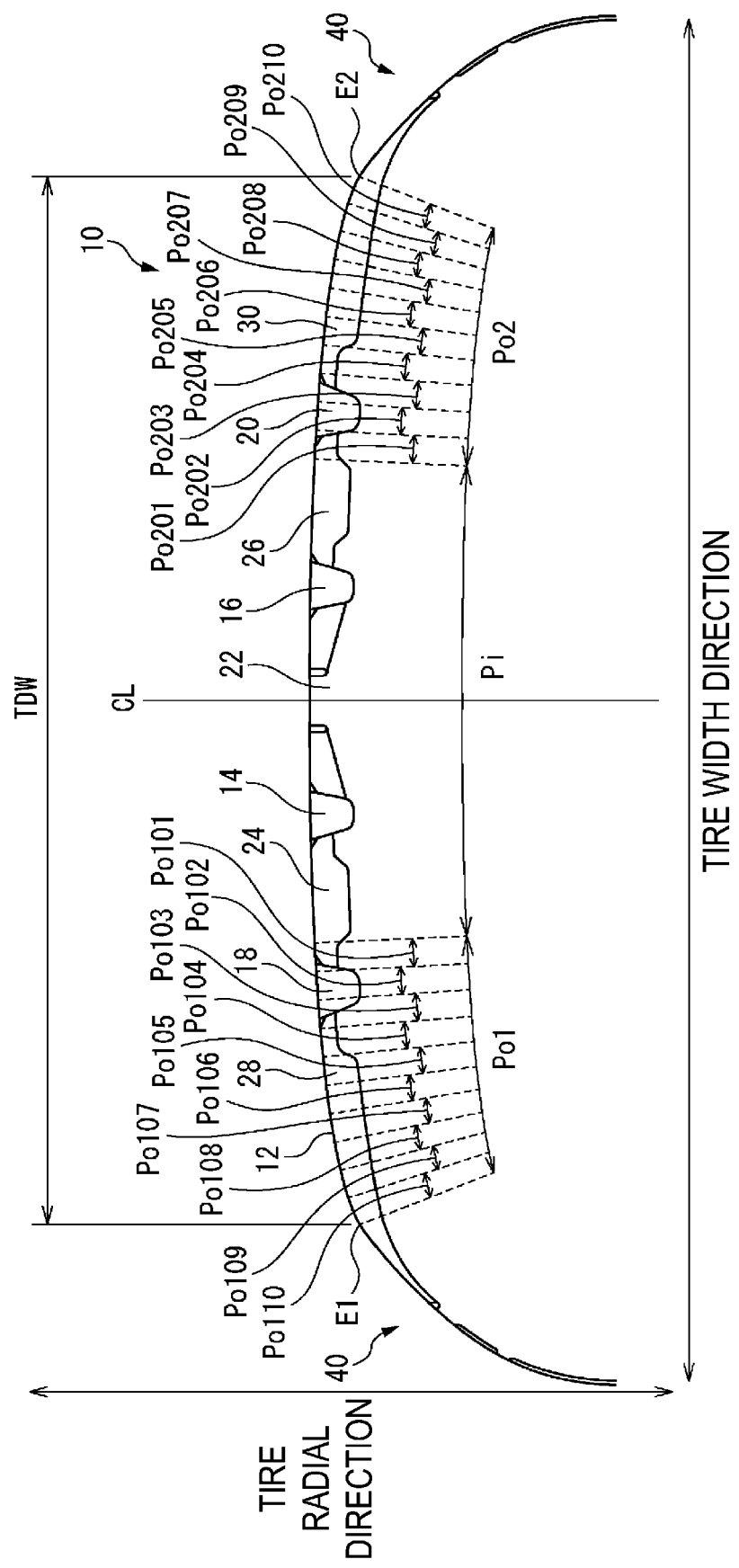

PNEUMATIC TIRE

TECHNICAL FIELD

The present technology relates to a pneumatic tire for which wet steering stability performance (hereinafter "wet steering stability") and dry steering stability performance (hereinafter "dry steering stability") are improved in a well-balanced manner.

BACKGROUND ART

Conventionally, improving wet steering stability while maintaining dry steering stability has been a demand when developing an original equipment tire such as that for a sports utility vehicle or a sports sedan.

In response to such a demand, drainage properties have been improved by, for example, including a relatively large amount of silica in cap tread rubber used as a tire material and increasing the main groove area in the tire structure.

For example, one known technology for improving wet steering stability while maintaining dry steering stability is a pneumatic tire in which, when, of a plurality of land portions, a land portion adjacent to the tire equatorial plane side with respect to an outermost outer circumferential main groove is defined as an outer second land portion and a land portion adjacent to the outer side in the tire width direction is defined as an outer shoulder land portion, and, of the plurality of land portions, a land portion adjacent to the tire equatorial plane side with respect to an outermost inner circumferential main groove is defined as an inner second land portion and a land portion adjacent to the outer side in the tire width direction is defined as an inner shoulder land portion, the pneumatic tire includes a communication lug groove continuously extending from the outer shoulder land portion across the tire equatorial plane until the inner second land portion and terminating within the inner second land portion, and a subsidiary groove formed in the inner second land portion that extends through a terminating end of the communication lug groove and is separated from the outermost inner circumferential main groove (see Japan Unexamined Patent Publication No. 2018-079903).

In the technology described in Japan Unexamined Patent Publication No. 2018-079903, forming the communication lug groove and the subsidiary groove increases the groove area ratio, so excellent wet steering stability can be achieved. However, increasing land portion rigidity to improve steering stability counteracts any improvement in drainage properties. Thus, technology designed to improve drainage properties may not be able to achieve satisfactory dry steering stability.

Thus, in a case where the technology described in Japan Unexamined Patent Publication No. 2018-079903 is employed, there is room for improvement in terms of dry steering stability.

SUMMARY

The present technology provides a pneumatic tire for which dry steering stability and wet steering stability are improved in a well-balanced manner.

A pneumatic tire according to an embodiment of the present technology includes, in a tire meridian cross-sectional view of an unloaded state in which regular internal pressure is applied, a tire profile between two ground contact edges constituted by two tire outer side profiles each having a dimension along the tire profile of 20% or more and 35% or less with respect to a dimension between the ground contact edges along the tire profile, and a tire inner side profile other than the two tire outer side profiles, the tire outer side profiles being constituted by at least four curved lines having different shapes.

In the pneumatic tire according to an embodiment of the present technology, the tire profile in the tire meridian cross-sectional view is divided into a tire outer side profile and a tire inner side profile, and the tire outer side profile in particular is improved. As a result, with the pneumatic tire according to an embodiment of the present technology, dry steering stability and wet steering stability can be improved in a well-balanced manner.

BRIEF DESCRIPTION OF THE DRAWING

The Drawing is a tire meridian cross-sectional view illustrating a pneumatic tire according to an embodiment of the present technology.

DETAILED DESCRIPTION

Pneumatic tires according to embodiments of the present technology (Basic Embodiment and Additional Embodiments 1 to 3 described later) will be described in detail below with reference to the drawings. Note that these embodiments do not limit the present technology. Constituents of the embodiments include constituents that can be substituted or easily conceived by one skilled in the art or substantially identical constituents. In addition, various modes included in the embodiments can be combined as desired within the scope of obviousness by one skilled in the art.

Basic Embodiment

The Basic Embodiment of the pneumatic tire according to an embodiment of the present technology will be described below. Herein, "tire radial direction" refers to the direction orthogonal to the rotation axis of the pneumatic tire, "inner side in the tire radial direction" refers to a side toward the rotation axis in the tire radial direction, and "outer side in the tire radial direction" refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. Note that "tire equatorial plane" refers to the plane orthogonal to the rotation axis of the pneumatic tire, the plane passing through the center of the tire width of the pneumatic tire.

The Drawing is a tire meridian cross-sectional view illustrating a pneumatic tire according to an embodiment of the present technology. Note that the Drawing illustrates an example of an unloaded state where regular internal pressure is applied to a regular rim.

Here, "regular rim" refers to an "applicable rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Additionally, a regular internal pressure refers to a "maximum air pressure" specified by JATMA, a maximum value in "TIRE LOAD LIMITS AT VARIOUS COLD INFLATION PRESSURES" specified by TRA, or "INFLATION PRESSURES" specified by ETRTO.

A tread portion 10 of the pneumatic tire illustrated in the Drawing is made of a rubber material (tread rubber) and is exposed on the outermost side of the pneumatic tire in the tire radial direction, with the surface thereof constituting the contour of the pneumatic tire. The surface of the tread portion 10 is formed as a tread surface 12, corresponding to a surface that comes into contact with a road surface during travel of a vehicle (not illustrated) mounted with the pneumatic tire. In the example illustrated in the Drawing, five land portions 22, 24, 26, 28, and 30 are defined and formed by two circumferential main grooves 14 (16) and 18 (20) on both sides of the tire equatorial plane CL. Note that, as illustrated in the Drawing, shoulder portions 40 are continuous on both sides in the tire width direction of the tread portion 10.

Further, as illustrated in the Drawing, in the pneumatic tire of the present embodiment, the tire profile between two ground contact ends E1 and E2 (specifically, the profile when there is no groove) is constituted by two tire outer side profiles Po1 and Po2 each having a dimension along the tire profile of 20% or more and 35% or less with respect to a dimension between the two ground contact ends along the tire profile, and a tire inner side profile Pi other than the two tire outer side profiles Po1 and Po2.

Based on such a premise, in the pneumatic tire according to an embodiment of the present technology, the tire outer side profiles Po1 and Po2 are each constituted by at least four curved lines having different shapes (in the Drawing, 10 curved lines having different shapes). In contrast, the tire inner side profile Pi may be constituted by one curved line as illustrated in the Drawing, or may be constituted by a plurality of curved lines.

Effects

As described above, a large number of pneumatic tires having improved wet steering stability while maintaining dry steering stability have been developed. In conjunction with this development, further increasing dry steering stability has been a focus in recent years. Accordingly, the present inventors diligently investigated how to improve dry steering stability without reducing drainage properties, even when using a tire having improved wet steering stability.

As a result, the present inventors focused on improving dry steering stability from the perspective of ground contact pressure, that is, from the perspective of reducing the difference in ground contact pressure between a portion where ground contact pressure is high and a portion where ground contact pressure is low in the tire width direction to level out the ground contact pressure in the tire width direction, without changing the shape or the like of the grooves formed in the tread surface.

In other words, for example, the ground contact pressure of the pneumatic tire described in Japan Unexamined Patent Publication No. 2018-079903 was investigated, and it was found that a portion (in particular, near the ground contact edge) where ground contact pressure is clearly higher than at other portions is more likely present in a shoulder region (region other than a center region between both ground contact edges) than in the center region (tire inner side profile including the tire equatorial plane and having a dimension along the tire profile (more specifically, the tire profile when there is no groove) of 30% or more and 60% or less with respect to the dimension between both ground contact edges along the tire profile) at or near the tire equatorial plane.

This is because, when the tire is loaded with lateral force during lane changing or cornering, for example, stress is particularly concentrated near the ground contact edges in the shoulder region, and this causes an increase in the ground contact length in the tire circumferential direction and an increase in the ground contact pressure near the ground contact edges.

Accordingly, the present inventors found that changing the profile portion in the shoulder region (in particular, near the ground contact edges) to reduce the ground contact pressure in the shoulder region suppresses the generation of portions having significantly different ground contact pressures in tire width direction regions when the tire is viewed as a whole. As a result, dry steering stability can be increased without changing the shape or the like of the groove formed in the tread surface when, for example, a tire having improved wet steering stability is used, and thus dry steering stability and wet steering stability can be improved in a well-balanced manner.

As illustrated in the Drawing, based on the above-described findings, the tire outer side profiles Po1 and Po2 corresponding to the shoulder regions are constituted by at least four curved lines having different shapes in the present embodiment (in the Drawing, Po101 to Po110 and Po201 to Po210, respectively).

With this configuration, the tire outer side profile Po1, Po2 is subdivided by being divided into four or more portions, so that the ground contact pressure can be reduced as compared with the related art in regions where the ground contact pressure is locally high. As a result, generation of portions where the ground contact pressure is significantly different in the tire width direction regions when the tire is viewed as a whole can be suppressed and the ground contact pressure can be leveled, whereby dry steering stability can be enhanced and, as a result, dry steering stability and wet steering stability can be improved in a well-balanced manner. Note that the at least four curved lines having different shapes of each of the tire outer side profiles (in the Drawing, the curved lines Po101 to Po110 and Po201 to Po210 having different shapes) are preferable because gradually decreasing the radius of curvature from the curved line on the inner side in the tire width direction toward the curved line on the outer side in the tire width direction can efficiently achieve the effect of leveling the ground contact pressure in the tire width direction.

When the tire outer side profile Po1, Po2 is divided into only two or three portions, the profile portion improved to reduce the ground contact pressure when leveling the ground contact pressure and the profile portion adjacent to that profile portion have significantly different shapes. And thus, in such a case, so-called buckling (a phenomenon where the tread surface curves in a wave shape) may occur. Accordingly, in the present embodiment, the number of profile portions of the tire outer side profile Po1, Po2 after division is set to four or more.

Additionally, in the present embodiment, the proportion of the dimension along the tire profile of the tire outer side profile Po1, Po2 with respect to the dimension between both ground contact edges E1 and E2 along the tire profile (hereinafter referred to as "tire outer side profile proportion") is 20% or more and 35% or less. By setting the tire outer side profile proportion to 20% or more, the tire outer side profile Po1, Po2 being the ground contact pressure reduction target can be sufficiently ensured. As a result, the number of divisions of the tire outer side profile Po1, Po2 can be sufficiently ensured, and the effect of reducing the ground contact pressure can be sufficiently obtained. Thus, excellent dry steering stability can be achieved. Setting the tire outer side profile proportion to 22% or more is preferable because the above effect is achieved at a higher level, and setting the tire outer side profile proportion to 25% or more is extremely preferable because the above effect is achieved at an extremely high level.

In contrast, by setting the tire outer side profile proportion to 35% or less, the tire inner side profile responsible for drainage properties can be sufficiently ensured, and thus excellent wet steering stability can be achieved. Setting the tire outer side profile proportion to 33% or less is preferable because the above effect is achieved at a higher level, and setting the tire outer side profile proportion to 30% or less is extremely preferable because the above effect is achieved at an extremely high level.

Although not illustrated in full, the pneumatic tire according to the present embodiment described above has the same meridian cross-sectional shape as a conventional pneumatic tire. In other words, in a tire meridian cross-sectional view, the pneumatic tire according to the present embodiment includes bead portions, sidewall portions, shoulder portions, and the tread portion in that order from the inner side to the outer side in the tire radial direction. For example, in a tire meridian cross-sectional view, the pneumatic tire includes a carcass layer that extends from the tread portion to the bead portions on both sides and is wound around a pair of bead cores, and the above-described belt layer and, in some cases, a belt cover layer on the outer side in the tire radial direction of the carcass layer.

The pneumatic tire according to the present embodiment described above is obtained through ordinary manufacturing steps, that is, a tire material mixing step, a tire material processing step, a green tire molding step, a vulcanization step, an inspection step after vulcanization, and the like. When manufacturing the pneumatic tire according to the present embodiment, for example, recess portions and protrusion portions corresponding to the grooves illustrated in the Drawing are formed in the inner wall of a vulcanization mold, and vulcanization is performed by using this mold.

Additional Embodiments

Next, Additional Embodiments 1 to 3 will be described. These Additional Embodiments 1 to 3 can be optionally implemented with respect to the Basic Mode of the pneumatic tire according to an embodiment of the present technology.

Additional Embodiment 1

In the Basic Embodiment, the radius of curvature (hereinafter referred to as "radius of curvature 1") of the curved line on the innermost side in the tire width direction (In the Drawing, the profile portion Po101 and/or the profile portion Po201) of a portion (curved line) constituting at least one of the tire outer side profiles Po1 or Po2 illustrated in the Drawing is preferably 0.40 times or more and 0.60 times or less the radius of curvature (hereinafter referred to as "radius of curvature 2") of the curved line on the outermost side in the tire width direction (in the example of the Drawing, the profile Pi) of the portion (curved line) constituting the tire inner side profile Pi (Additional Embodiment 1).

By setting the (radius of curvature 1/radius of curvature 2) to 0.40 or more, it is possible to further suppress the generation of buckling at the connection point between these adjacent curved lines without causing the shape of the profile portion Po101 and/or the profile portion Po201 to be excessively different from the shape of the profile Pi, which is adjacent to the profile portion Po101 and/or the profile portion Po201.

In contrast, by setting the (radius of curvature 1/radius of curvature 2) to 0.60 or less, the radius of curvature of the tire outer side profile Po1 (Po2) corresponding to the shoulder region in which the ground contact pressure is relatively high can be made further different with respect to the radius of curvature of the tire inner side profile Pi corresponding to the center region in which the ground contact pressure is relatively low. This can further suppress the generation of portions where the ground contact pressure is significantly different in each of the tire width direction regions when the tire is viewed as a whole, and thus dry steering stability can be further enhanced, and consequently, dry steering stability and wet steering stability can be further improved in a well-balanced manner.

Setting the (radius of curvature 1/radius of curvature 2) to 0.42 or more and 0.58 or less is further preferable because the above effect is achieved at a higher level, and setting the (radius of curvature 1/radius of curvature 2) to 0.45 or more and 0.55 or less is extremely preferable because the above effect is achieved at an extremely high level.

Additional Embodiment 2

In the Basic Embodiment or a configuration where the Additional Embodiment 1 is added to the Basic Embodiment, the radius of curvature (hereinafter referred to as "radius of curvature 3") of the second profile portion Po102 (Po202) from the inner side in the tire width direction among the curved lines constituting the tire outer side profile Po1 (tire outer side profile Po2) illustrated in the Drawing is preferably 0.70 times or more and 0.90 times or less the radius of curvature 1 of the profile portion Po101 (Po201) on the innermost side in the tire width direction among the curved lines constituting the tire outer side profile Po1 (tire outer side profile Po2) (Additional Embodiment 2).

By setting the (radius of curvature 3/radius of curvature 1) to 0.70 or more, it is possible to suppress the generation of buckling at the contact point between these curved lines without causing the shape of the profile portion Po102 (profile Po202) to be excessively different from the shape of the profile portion Po101 (profile Po201) adjacent to the profile portion Po102 (profile Po202).

On the other hand, by setting the (radius of curvature 3/radius of curvature 1) to 0.90 or less, the radius of curvature 3 of the profile Po102 (profile Po202) on the outer side in the tire width direction at which the ground contact pressure is relatively high is further made different to the radius of curvature 1 of the profile portion Po101 (profile Po201) on the innermost side in the tire width direction at which the ground contact pressure is relatively low in the shoulder region. This further suppresses the generation of portions where the ground contact pressure is significantly different in each of the tire width direction regions when the entire shoulder region is viewed, and thus further increases dry steering stability. As a result, dry steering stability and wet steering stability can be further improved in a well-balanced manner.

Setting the (radius of curvature 3/radius of curvature 1) to 0.72 or more and 0.88 or less is further preferable because each of the above effects is achieved at a high level, and setting the (radius of curvature 3/radius of curvature 1) to 0.75 or more and 0.85 or less is extremely preferable because each of the above effects is achieved at an extremely high level.

Additional Embodiment 3

In the Basic Embodiment or an embodiment in which at least one of the Additional Embodiments 1 or 2 is added to the Basic Embodiment, the dimension along the tire profile of each profile portion Po101 to Po 110 (each profile portion Po201 to Po210) constituting the tire outer side profile Po1 (Po2) illustrated in the Drawing (hereinafter referred to as "dimension of each curved line") is preferably 2.0% or more and 5.0% or less of a tread development width (Additional Embodiment 3). Here, the tread development width refers to a tire width direction dimension TDW between the ground contact edges E1 and E2 in the Drawing.

By setting the dimension of each profile portion to 2.0% or more of the tread development width, an increase in the number of divisions of each profile portion in the tire outer side profile Po1, Po2 can be suppressed. Accordingly, it is possible to suppress an increase in the number of components of the mold to be used, and also suppress an increase in man-hours required for tire manufacturing. As a result, it is possible to reduce the manufacturing cost of the tire.

In addition, by setting the dimension of each profile portion to 5.0% or less of the tread development width, the number of divisions of each profile portion of the tire outer side profiles Po1 and Po2 can be sufficiently ensured. The positions of the tire outer side profiles Po1 and Po2 in the tire radial direction need to be substantially different between the inner end and the outer end in the tire width direction to make the ground contact pressure uniform. Thus, when the number of divisions is sufficiently secured, there is no need to drastically change the radius of curvature between adjacent profiles, and buckling at the connection point between adjacent curved lines can be efficiently suppressed.

Setting the dimension of each profile portion to 2.2% or more and 4.8% or less of the tread development width is further preferable because the above effect is achieved at a higher level, and setting the dimension of each profile portion to 2.5% or more and 4.5% or less of the tread development width is extremely preferable because the above effect is achieved at an extremely high level.

Examples

Pneumatic tires according to Examples 1 to 4 and a Conventional Example having a tire size of 225/50R18 95V (specified by JATMA) and having the shape illustrated in the Drawing were manufactured. Note that detailed conditions of these pneumatic tires are as shown in Table 1 below.

Note that in Table 1, the tire outer side profile proportion refers to the proportion of each dimension along the tire profile of the two tire outer side profiles with respect to the dimension between both ground contact edges along the tire profile. The number of divisions of the tire outer side profile (both) refers to the number of elements (profile portions) constituting the tire outer side profiles Po1 and Po2 illustrated in the Drawing. The radius of curvature 1 refers to the radius of curvature of the curved line (profile portion Po101, profile portion Po201) on the innermost side in the tire width direction of the curved line constituting the tire outer side profiles Po1 and Po2 illustrated in the Drawing. The radius of curvature 2 refers to the radius of curvature of the tire inner side profile Pi illustrated in the Drawing. The radius of curvature 3 refers to the radius of curvature of the second curved line (profile portion Po102, profile portion Po202) from the inner side in the tire width direction of the curved lines constituting the tire outer side profile Po1 (Po2) illustrated in the Drawing. The dimension of each curved line refers to a dimension along the tire profile of each curved line (profile portions Po101 to Po110, profile portions Po201 to Po210) constituting the tire outer side profile Po1 (Po2) illustrated in the Drawing. The reference signs and the like included in these terms are in accordance with the descriptions described above in the present specification.

The pneumatic tires according to Examples 1 to 4 and the pneumatic tire according to Conventional Example manufactured in this manner were evaluated for dry steering stability and wet steering stability in accordance with the following procedures.

Evaluation of Dry Steering Stability/Wet Steering Stability

The performance evaluation tests were performed by mounting a sample tire on a JATMA standard rim wheel with a rim size of 7J, adjusting the air pressure to 230 kPa, mounting test tires on all wheels of a front-wheel drive vehicle as an evaluation vehicle with an engine displacement of 2000 cc, and then test-driving the evaluation vehicle.

For the dry steering stability, the test vehicle was driven at a speed of from 10 to 180 km/hr on a test course with a dry road surface having a flat course, and a test driver performed sensory evaluation on steering characteristics when changing lanes and when cornering, and on stability when traveling straight. The dry steering stability is displayed as an index value with Conventional Example used as a reference at 100. A larger index value indicates better dry steering stability. The results are shown in Table 1.

For the wet steering stability, the test vehicle was driven at a speed of 40 km/hr on a test course with an asphalt road covered in a water film having a depth of 1 mm, and a test driver performed sensory evaluation on steering characteristics when changing lanes and when cornering, and on stability when traveling straight. The wet steering stability is displayed as an index value with Conventional Example used as a reference at 100. A larger index value indicates better wet steering stability. The results are shown in Table 1.

TABLE 1

|  | Conventional Example | Example 1 | Example 2 | Example 3 | Example 4 |
| --- | --- | --- | --- | --- | --- |
| Ratio of tire outer side profile (%) | 19 | 25 | 25 | 25 | 25 |
| Number of divisions of tire outer side profile (both) | 3 | 4 | 4 | 4 | 4 |

TABLE 1-continued

|  | Conventional Example | Example 1 | Example 2 | Example 3 | Example 4 |
|---|---|---|---|---|---|
| Radius of curvature 1/radius of curvature 2 | 0.62 | 0.62 | 0.58 | 0.58 | 0.58 |
| Radius of curvature 3/radius of curvature 1 | 0.92 | 0.92 | 0.92 | 0.88 | 0.88 |
| Dimension of each curved line (%) with respect to tread development width | 5.2 | 5.2 | 5.2 | 5.2 | 4.8 |
| Dry steering stability | 100 | 101 | 103 | 104 | 105 |
| Wet steering stability | 100 | 100 | 100 | 100 | 100 |

Table 1 shows that each of the pneumatic tires according to Examples 1 to 4 that comply with the technical scope of the present technology (that is, the pneumatic tires in which the tire profile in a tire meridian cross-sectional view is divided into the tire outer side profile and the tire inner side profile, and the tire outer side profile in particular is improved) has improved dry steering stability and wet steering stability in a well-balanced manner, as compared with the pneumatic tire according to Conventional Example that does not comply with the technical scope of the present technology.

The invention claimed is:

1. A pneumatic tire comprising, in a tire meridian cross-sectional view of an unloaded state in which regular internal pressure is applied, a tire profile between two ground contact edges consisting of two tire outer side profiles each having a dimension along the tire profile of 20% or more and 35% or less with respect to a dimension between the ground contact edges along the tire profile, and a tire inner side profile other than the two tire outer side profiles, the tire outer side profiles comprising at least four curved lines having different shapes and the tire inner side profile consisting of one curve having a same curvature.

2. The pneumatic tire according to claim 1, wherein a radius of curvature of a curved line on the innermost side in a tire width direction among the curved lines comprising the tire outer side profiles is 0.40 times or more and 0.60 times or less of a radius of the one curve of the tire inner side profile.

3. The pneumatic tire according to claim 2, wherein a radius of curvature of a second curved line from an inner side in the tire width direction among the curved lines comprising the tire outer side profiles is 0.70 times or more and 0.90 times or less of a radius of curvature of a curved line on an innermost side in the tire width direction of the curved lines comprising the tire outer side profiles.

4. The pneumatic tire according to claim 3, wherein a dimension along the tire profile of each curved line comprising the tire outer side profiles is 2.0% or more and 5.0% or less of a tread development width.

5. The pneumatic tire according to claim 1, wherein a radius of curvature of a second curved line from an inner side in the tire width direction among the curved lines comprising the tire outer side profiles is 0.70 times or more and 0.90 times or less of a radius of curvature of a curved line on an innermost side in the tire width direction of the curved lines comprising the tire outer side profiles.

6. The pneumatic tire according to claim 1, wherein a dimension along the tire profile of each curved line comprising the tire outer side profiles is 2.0% or more and 5.0% or less of a tread development width.

* * * * *